(12) United States Patent
Woodington et al.

(10) Patent No.: US 12,134,474 B2
(45) Date of Patent: Nov. 5, 2024

(54) AIRCRAFT PASSENGER ACCOMMODATION UNIT

(71) Applicant: Safran Seats GB Limited, Cwmbran (GB)

(72) Inventors: James B. Woodington, Cwmbran (GB); Heather CK Leung, Cwmbran (GB); Michael Riley, Cwmbran (GB)

(73) Assignee: SAFRAN SEATS GB LIMITED, Cwmbran (GB)

( * ) Notice: Subject to any disclaimer, the term of this patent is extended or adjusted under 35 U.S.C. 154(b) by 0 days.

(21) Appl. No.: 17/766,878

(22) PCT Filed: Oct. 7, 2020

(86) PCT No.: PCT/GB2020/052474
§ 371 (c)(1),
(2) Date: Apr. 6, 2022

(87) PCT Pub. No.: WO2021/069886
PCT Pub. Date: Apr. 15, 2021

(65) Prior Publication Data
US 2024/0076041 A1    Mar. 7, 2024

(30) Foreign Application Priority Data
Oct. 8, 2019 (GB) ..................... 1914496

(51) Int. Cl.
*B64D 11/06* (2006.01)
*E05C 19/16* (2006.01)
(Continued)

(52) U.S. Cl.
CPC ........ *B64D 11/0606* (2014.12); *E05D 15/165* (2013.01); *E05D 15/48* (2013.01); *E05C 19/16* (2013.01); *E05Y 2900/502* (2013.01)

(58) Field of Classification Search
CPC ............ B64D 11/0606; B64D 11/0023; B64D 11/0627; E05D 15/1065; E05D 13/00;
(Continued)

(56) References Cited

U.S. PATENT DOCUMENTS

2013/0241247 A1*  9/2013  Wallace ............. B64D 11/0604
                                                        297/118
2017/0106980 A1*  4/2017  Kuyper .............. B64D 11/0604
(Continued)

FOREIGN PATENT DOCUMENTS

GB          2433433 A       6/2007
GB          2548901 A      10/2017
(Continued)

OTHER PUBLICATIONS

International Patent Application No. PCT/GB2020/052474, International Search Report and Written Opinion, dated Jan. 14, 2021.
(Continued)

*Primary Examiner* — Michael C Zarroli
*Assistant Examiner* — Peter A Taraschi
(74) *Attorney, Agent, or Firm* — Kilpatrick Townsend & Stockton LLP

(57) ABSTRACT

The invention provides an aircraft passenger accommodation unit comprising a seat, a shell defining an opening that allows a passenger to egress between an aisle and the seat and a door, comprising a base portion, translatable in a first direction across the opening of the shell, between a retracted position and an extended position, and a second portion, translatable relative to the base portion in a second direction that is transverse to the first direction, between a stowed position and a deployed position. When the second portion is in the deployed position, the base portion is able to translate between the extended position and the retracted
(Continued)

position. The invention also provides a method of opening and a method of closing a door.

18 Claims, 13 Drawing Sheets

(51) Int. Cl.
*E05D 15/16* (2006.01)
*E05D 15/48* (2006.01)

(58) Field of Classification Search
CPC ....... E05D 13/003; E05D 15/06; E05D 15/48; E05C 19/02; E05C 17/20; E05C 7/00; E05C 19/18; E05C 19/007; B65D 45/18; B65D 45/08; E05Y 2900/502; E06B 3/4423; E06B 3/921; E06B 3/925
USPC .......................................... 49/449, 450, 451
See application file for complete search history.

(56) References Cited

U.S. PATENT DOCUMENTS

| | | | | |
|---|---|---|---|---|
| 2017/0259923 | A1* | 9/2017 | Morgan | B64D 11/0644 |
| 2018/0281963 | A1* | 10/2018 | Dowty | B64D 11/0606 |
| 2019/0210733 | A1 | 7/2019 | Herault et al. | |

FOREIGN PATENT DOCUMENTS

| | | | |
|---|---|---|---|
| GB | 2563150 A | 12/2018 | |
| WO | 2018033599 A1 | 2/2018 | |
| WO | 2018093825 A1 | 5/2018 | |
| WO | WO-2018184778 A1 * | 10/2018 | ......... B64D 11/0023 |

OTHER PUBLICATIONS

United Kingdom Patent Application No. 1914496.3, Search Report, dated Mar. 13, 2020.

* cited by examiner

AIRCRAFT PASSENGER ACCOMMODATION UNIT

CROSS-REFERENCE TO RELATED APPLICATIONS

This application is a national stage application of International Patent Application PCT/GB2020/052474, filed on Oct. 7, 2020 and titled "AIRCRAFT PASSENGER ACCOMMODATION UNIT," which is related to and claims priority to United Kingdom Patent Application No. 1914496.3, filed on Oct. 8, 2019, both of which are hereby incorporated by reference in their entireties.

BACKGROUND OF THE INVENTION

The present disclosure relates to an aircraft passenger accommodation unit for location in an aircraft cabin. The disclosure also provides a method of opening and a method of closing a door.

Business class and first class seating generally aims to provide aircraft passengers with as much privacy as possible. However, safety restrictions require that passengers are visible to cabin crew in some circumstances, and require that passengers can easily access the aisle in event of emergency. These restrictions constrain the design of aircraft passenger accommodation units.

Privacy doors and windows for aircraft passenger accommodation units are known. WO2018/033599A1, US2018/281963A1 and GB2548901A all disclose examples of doors of aircraft passenger accommodation units, which improve a seat occupant's privacy. WO2018/033599A1 is an example of a seat unit with a closure means that comprises two walls. The first wall, which is a lower wall, can be displaced in a horizontal direction parallel to the longitudinal axis of the aircraft cabin in order to close off a lower portion of a transverse passage between an aisle and the seat unit. The second wall can be displaced relative to the first wall, in a vertical direction, in order to close off an upper portion of the transverse passage.

Often, privacy doors slide or pivot between open and closed configurations, thus enabling variable levels of passenger privacy and/or variable access between the passenger seat and the aisle. Pivotable doors may pivot outwardly into an aisle, causing an obstruction. It is desirable to maximise available space in the aircraft cabin and it is important to avoid obstructing the aisle, to allow other passengers and cabin crew to safely move about the plane.

Often, privacy doors generally use a straightforward pivoting or sliding mechanism to move between open and closed configurations. If this mechanism were to fail, passenger access to the aisle may be blocked, which is undesirable.

The present invention seeks to mitigate the above-mentioned problems. Alternatively, or additionally, the present invention seeks to provide an improved aircraft passenger accommodation unit.

SUMMARY OF THE INVENTION

The present invention provides, according to a first aspect, an aircraft passenger accommodation unit for location in an aircraft cabin adjacent to an aisle. The aircraft passenger accommodation unit comprises a seat, and a shell at least partially surrounding the seat, wherein the shell defines an opening that allows a passenger to egress between the aisle and the seat. The aircraft passenger accommodation unit comprises a door for providing variable access through the opening between the aisle and the seat. The door comprises a base portion, which is translatable in a first direction across the opening of the shell. The base portion is translatable between a retracted position, which allows passenger egress between the seat and the aisle through the opening, and an extended position, in which passenger egress between the aisle and the seat through the opening is at least partially blocked by the base portion. The door comprises a second portion, which is translatable relative to the base portion in a second direction that is transverse to the first direction. The second portion is translatable between a stowed position, in which the second portion at least partially overlaps the base portion to define a first overlap area of the base portion, and a deployed position, in which a second overlap area of the base portion is defined, the second overlap area being smaller than the first overlap area. When the second portion is in the deployed position, the base portion is able to translate between the extended position and the retracted position.

The first direction may be a direction that is substantially parallel to the aircraft cabin floor when the aircraft passenger accommodation unit is in position within the aircraft. The second direction may be a direction that is substantially perpendicular to the plane of the aircraft cabin floor when the aircraft passenger accommodation unit is in position within the aircraft. The translational movements of the door may be within a plane (or substantially parallel to the plane) of a wall of the shell. Advantageously, this means that the door does not swing out into the aisle, or swing inwardly into the aircraft passenger accommodation unit as the door is moved between open and closed positions. The door is therefore space efficient, and there is no risk of the door causing an obstruction in the aisle.

Such a door provides variable access levels by providing an open configuration and multiple partially open configurations that can be obtained through different opening/closing mechanisms. Providing variable access levels enables passengers and airline staff to choose an appropriate level of privacy. Providing multiple configurations that allow access to the aisle through different opening/closing mechanisms fulfils safety requirements, because a secondary mode of opening the door is available, in the event that a first mechanism fails.

When the second portion is in the stowed position, the height of the door may be less than 0.63 m from the aircraft cabin floor, or less than 0.6 m from the aircraft cabin floor, to comply with air traffic regulations.

The seat may be a reclinable seat, and may be able to fully recline into a bed.

The aircraft passenger accommodation unit may further comprise a support mechanism, wherein the support mechanism is arranged to support the second portion when the second portion is in the deployed position.

The support mechanism may comprise a guide mechanism arranged to guide translation of the second portion when the second portion is in the deployed position and the base portion is translated between the extended and retracted positions.

The guide mechanism may maintain a constant second overlap area when the second portion is in the deployed position and the base portion is translated between the extended and retracted positions.

The guide mechanism may comprise a guide track and a corresponding guide member. The second portion may be provided with one of the guide track and the guide member, and the shell may be provided with the other of the guide track and the guide member. The guide track and guide member may be arranged so that the guide member is engageable with and translatable relative to the guide track, so as to guide translation of the second portion when the second portion is in the deployed position and the base portion is translated between the extended and retracted positions.

The guide track and guide member may be arranged to enable the second portion to translate coincidentally with the base portion, whilst the second portion is in the deployed position. If the base portion is translated between the extended and retracted positions whilst the second portion is in the deployed state, the second portion can translate coincidentally, thereby enabling the door to move between an open position and a closed position whilst the door is at its full height.

This means that when the second portion is in the deployed position, a passenger can simultaneously slide both the second portion and the base portion between the extended and retracted positions, thereby moving the door between an open position and a closed position, whilst the door is at its full height.

The guide track may be provided on, and extend across the section portion of the door in a direction substantially parallel to the first direction, and the guide member may be provided on the shell.

The guide track may be provided on an inner surface of the second portion (i.e. a surface facing towards the seat).

The guide track may comprise a first rail and a second rail, or an upper track and a lower track. The direction of the rails or the tracks will define the translation direction of the upper portion of the door. The guide track may therefore run parallel to the first direction. When the aircraft passenger accommodation unit is in position in an aircraft, the guide track may run in a direction that is substantially parallel to the aircraft cabin floor.

The guide member may comprise at least two guide jaws, and a biasing member that biases the jaws towards each other to retain the guide track in between the jaws when the second portion is in the deployed position.

The guide member provides a way of supporting the second portion of the door in the deployed position. As a passenger slides the second portion of the door into the deployed position, the second portion will be pushed against the jaws of the guide member. This causes the jaws of the guide member to open, against the force of the biasing member, which acts to close the jaws. This allows the guide track of the second portion to enter the jaws and then for the jaws to then close against the outer surfaces of the second portion, thus supporting the second portion in the deployed position. In other words, movement of the second portion to the deployed position, causes the jaws to open and close around the second portion, thereby supporting the second portion. No separate actuation of the jaws (or guide member) is required.

The biasing member may comprise a spring, for example, provided between an outer wall of a jaw and an inner wall of the shell.

The guide member may comprise a release latch. When the release latch is activated, the release latch acts against the biasing member, and causes the guide jaws to move apart from each other, and enables the guide track to be released.

The shell may be provided with the guide member, and at least a portion of the release latch may protrude from the shell. The release latch may protrude from a hole or opening in the shell.

When the second portion is in the deployed state, activation of the release latch may allow the second portion to move to the stowed position.

The release latch provides passengers with an efficient method of moving the second portion of the door between the deployed position and the stowed position. If the release latch is activated, the second portion of the door may drop under gravity from the deployed position to the stowed position. In the event of an emergency, the release latch therefore provides an efficient method of moving the door to a partially open configuration, in which the passenger can egress the aisle (by stepping over the base portion).

The release latch may be easily accessed by passengers occupying the seat, therefore enabling the second portion to be easily moved from the deployed to the stowed configuration, and enabling rapid access to the aisle if necessary.

The guide member may comprise a first guide member abutment surface, and the guide track may comprise a corresponding first guide track abutment surface. The first guide member abutment surface and first guide track abutment surface may be arranged such that the first guide member abutment surface abuts the first guide track abutment surface when the second portion is in the deployed configuration, thereby preventing one of (a) movement of the second portion from the deployed configuration towards the stowed configuration, and (b) movement of the second portion from the deployed configuration further away from the stowed configuration.

The first guide member abutment surface may comprise a protrusion from one or both of the guide jaws. The first guide track abutment surface may comprise a protrusion from an upper or lower guide track or rail.

The first guide track abutment surface and first guide member abutment surface may be arranged to prevent movement of the second portion from the deployed configuration to the stowed configuration, by preventing downward movement of the second portion. The first guide member abutment surface may protrude below the first guide track abutment surface, thereby preventing downward movement of the guide track relative to the guide member. Alternatively, the first guide track abutment surface and first guide member abutment surface may arranged to prevent movement of the second portion from the deployed configuration, further away from the stowed configuration, by preventing upward movement of the second portion. The first guide track abutment surface may protrude below the first guide member abutment surface, thereby preventing upward movement of the guide track relative to the guide member.

The guide member may comprise a second guide member abutment surface, facing in an opposite direction to the first guide member abutment surface. The guide track may comprise a second guide track abutment surface, facing in an opposite direction to the second guide track abutment surface. The second guide member abutment surface and second guide track abutment surface are arranged such that the second guide member abutment surface abuts the second guide track abutment surface when the second portion is in the deployed configuration, thereby preventing the other of (a) movement of the second portion from the deployed configuration towards the stowed configuration, and (b) movement from the deployed configuration further away from the stowed configuration.

In the context of the present invention, a second abutment surface is considered to face in an opposite directions to a first abutment surface if the second surface has a component of its surface normal in an opposite to a component of the surface normal of the first abutment surface.

If the first guide track abutment surface and first guide member abutment surface are arranged to prevent movement of the second portion from the deployed configuration to the stowed configuration, the second guide track abutment surface and the second guide member abutment surface may be arranged to prevent movement from the deployed configuration further away from the stowed configuration.

If the first guide track abutment surface and first guide member abutment surface are arranged to prevent movement of the second portion from the deployed configuration further away from the stowed configuration, the second guide track abutment surface and second guide member abutment surface may be arranged to prevent movement from the deployed configuration towards the stowed configuration.

The first guide track abutment surface and second guide track abutment surface may be opposite surfaces of a single guide track or rail, or may be provided on different guide tracks or guide rails. The first guide member abutment surface and second guide member abutment surface may encase the first and second guide track abutment surfaces, thereby preventing movement of the second portion in from the deployment position both towards the stowed configuration and further away from the stowed configuration.

The abutment surfaces may prevent movement of the second portion relative to the upper portion in a direction parallel to the second direction, as the door translates between extended and retracted positions. The abutment surfaces may prevent movement of the second portion in from the deployment position both towards the stowed configuration and further away from the stowed configuration as the door translates between extended and retracted positions.

The aircraft passenger accommodation unit may further comprise a deployment guide mechanism, wherein the deployment guide mechanism is arranged to guide translation of the second portion between the stowed position and the deployed position.

The deployment guide mechanism comprises a deployment guide track and a deployment guide member. The base portion may be provided with one of the deployment guide track and the deployment guide member, and the second portion may be provided with the other of the deployment guide track and the deployment guide member, so as to guide the translation of the second portion between the stowed position and the deployed position.

The deployment guide track may be provided on the base portion and may run parallel to the second direction. The deployment guide track may be provided on the inside surface of the base portion (i.e. a surface of the base portion that faces towards the shell). When the aircraft passenger accommodation unit is positioned within an aircraft, deployment guide track may run in a direction that is substantially perpendicular to the plane of the aircraft cabin floor. The deployment guide track may comprise a pair of guide rails. The deployment guide track may comprises two pairs of guide rails provided on a base portion. Deployment guide members may be provided on the outer surface of the second portion (i.e. the surface that faces outwardly from the shell). Each guide member may be arranged to run in between a pair of deployment guide tracks as the second portion translates along the second direction between stowed and deployed positions. The base portion and the second portion may be offset such that as the second portion translates towards the stowed position, the second portion overlaps with the base portion. When the second portion is in the stowed position, it may be stowed inside of the base portion, in relation to the shell, and therefore may not be visible from outside the shell. When the second portion is in the stowed position, the base portion and the second portion may be approximately the same height, relative to the aircraft cabin floor.

The aircraft passenger accommodation unit may further comprise a retraction guide mechanism, wherein the retraction guide mechanism is arranged to guide translation of the base portion between the retracted and extended positions.

The retraction guide mechanism may be provided with a retraction guide track and a retraction guide member. The base portion may be provided with at least one of the retraction guide track and the retraction guide member, and the shell may be provided with the other of the retraction guide track and the retraction guide member, so as to guide translation of the base portion between the extended position and the retracted position.

The retraction guide mechanism may comprise pair of retraction guide tracks, arranged as an upper guide track and a lower guide track running substantially parallel to each other, and substantially parallel to the first direction. The tracks may be provided within a cavity of the shell, and on an inner facing wall of the cavity, or may be provided on an inner wall of the shell (i.e. a wall facing into the shell). Two pairs of tracks may be provided, running substantially parallel to each other, and substantially parallel to the first direction. Retraction guide members may be provided on the outer surface of the base portion (i.e. the surface facing away from the shell). A retraction guide member may be arranged to run between each pair of retraction guide tracks as the base portion translates between the extended and retracted positions.

The aircraft passenger accommodation unit may further comprise a securement mechanism, wherein the securement mechanism is arranged to secure the base position in the extended position.

The securement mechanism may comprise a two-part magnetic latch. The shell may be provided with a first part of the latch, and the base portion may be provided with a second part of the latch, the first and second parts being magnetically attracted to each other.

The first part of the latch may be provided within a cavity of the shell. When the base portion of the door is in the fully extended position, an edge of the base portion may extend into this cavity. The second part of the latch may be arranged proximate to the edge of the base portion, or may be provided on the edge of the base portion, such that the second part of the latch directly contacts the first part of the latch when the base portion is in the extended position.

One of the first and second parts of the latch may comprise a magnet, which may be an electromagnetic. The other of the first and second parts may comprise a magnetic material, which may be a ferromagnetic material.

The latch may comprise a third part provided on the second portion. The third part of the latch may be provided proximate to the edge of the second portion, or on the edge of the second portion. If the second portion is in the deployed position, and the base portion of the door is in the fully extended position, the third part of the latch may be in contact with the first part of the latch. The third part of the latch may comprise a magnetic material, such as a ferromagnet, or a magnet, such as an electromagnet, and may be magnetically attracted to the first part of the latch.

The shell of the aircraft passenger accommodation unit may comprise a cavity for housing the door when the base portion is in the retracted position. The cavity may provide space for the base portion and the second portion when the base portion is in the retracted position, and when the second portion is in the deployed position.

The cavity may be approximately the same height as the door, relative to the cabin floor when the second portion is in a fully deployed position. By providing a cavity for housing the door, the door can be retracted and stored out of view of the passenger, and when the door is in the retracted position, the door does not occupy space outside of the aircraft passenger accommodation unit.

According to a second aspect, the invention provides a method of closing the door of an aircraft passenger accommodation unit, wherein the aircraft passenger accommodation unit comprises a shell. The method comprises translating a base portion of the door in a first direction across an opening of the shell, from a retracted position, which allows passenger egress through the opening, to an extended position in which passenger egress through the opening is at least partially blocked. The method subsequently comprises translating a second portion of the door relative to the base portion in a second direction that is transverse to the first direction, from a stowed position, in which the second portion at least partially overlaps the base portion to define a first overlap area of the base portion, to a deployed position, in which a second overlap area of the base portion is defined, the second overlap area being smaller than the first overlap area.

The aircraft passenger accommodation unit may comprise any of the features set out above.

The method of closing the door may comprise securing the base portion of the door in an extended position using a magnetic latch.

The method of closing the door may further comprising securing the second portion of the door in the deployed position, whilst the base portion of the door is in the extended position, using a magnetic latch.

According to a third aspect, the invention comprises a method of opening or closing a door of an aircraft passenger accommodation unit. The method comprises translating a base portion of the door in a first direction between a retracted position, which allows passenger egress through an opening defined by a shell of the aircraft passenger accommodation unit, and an extended position in which passenger egress through the opening is at least partially blocked. The method comprises translating a second portion of the door relative to the base portion in a second direction that is transverse to the first direction, between a stowed position, in which the second portion at least partially overlaps the base portion to define a first overlap area of the base portion, and a deployed position, in which a second overlap area of the base portion is defined, the second overlap area being smaller than the first overlap area.

According to a fourth aspect, the invention provides a method of closing a door of an aircraft passenger accommodation unit. The aircraft passenger accommodation unit may comprise any of the features set out above. The method comprises translating the base portion of the door in a first direction across the opening of the shell, from a retracted position, which allows passenger egress between the seat and the aisle through the opening, to an extended position in which passenger egress between the aisle and the seat through the opening is at least partially blocked. The method subsequently comprises translating the second portion of the door relative to the base portion in a second direction that is transverse to the first direction, from a stowed position, in which the second portion at least partially overlaps the base portion to define a first overlap area of the base portion, to a deployed position, in which a second overlap area of the base portion is defined, the second overlap area being smaller than the first overlap area.

According to a fifth aspect, the invention provides a method of opening the door of an aircraft passenger accommodation unit. The aircraft passenger accommodation unit may comprise any of the features set out above. The method comprises translating the second portion of the door relative to the base portion towards a stowed position, in which the second portion at least partially overlaps the base portion to define a first overlap area of the base portion, from a deployed position, in which a second overlap area of the base portion is defined, the second overlap area being smaller than the first overlap area. The method subsequently comprises translating the base portion of the door in a direction across the opening of the shell, from an extended position, in which passenger egress between the aisle and the seat through the opening is at least partially blocked, to a retracted position which allows passenger egress between the seat and the aisle through the opening.

The method of opening the door may comprise activating a release latch to enable translation of the second portion of the door towards the stowed position from the deployed position.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
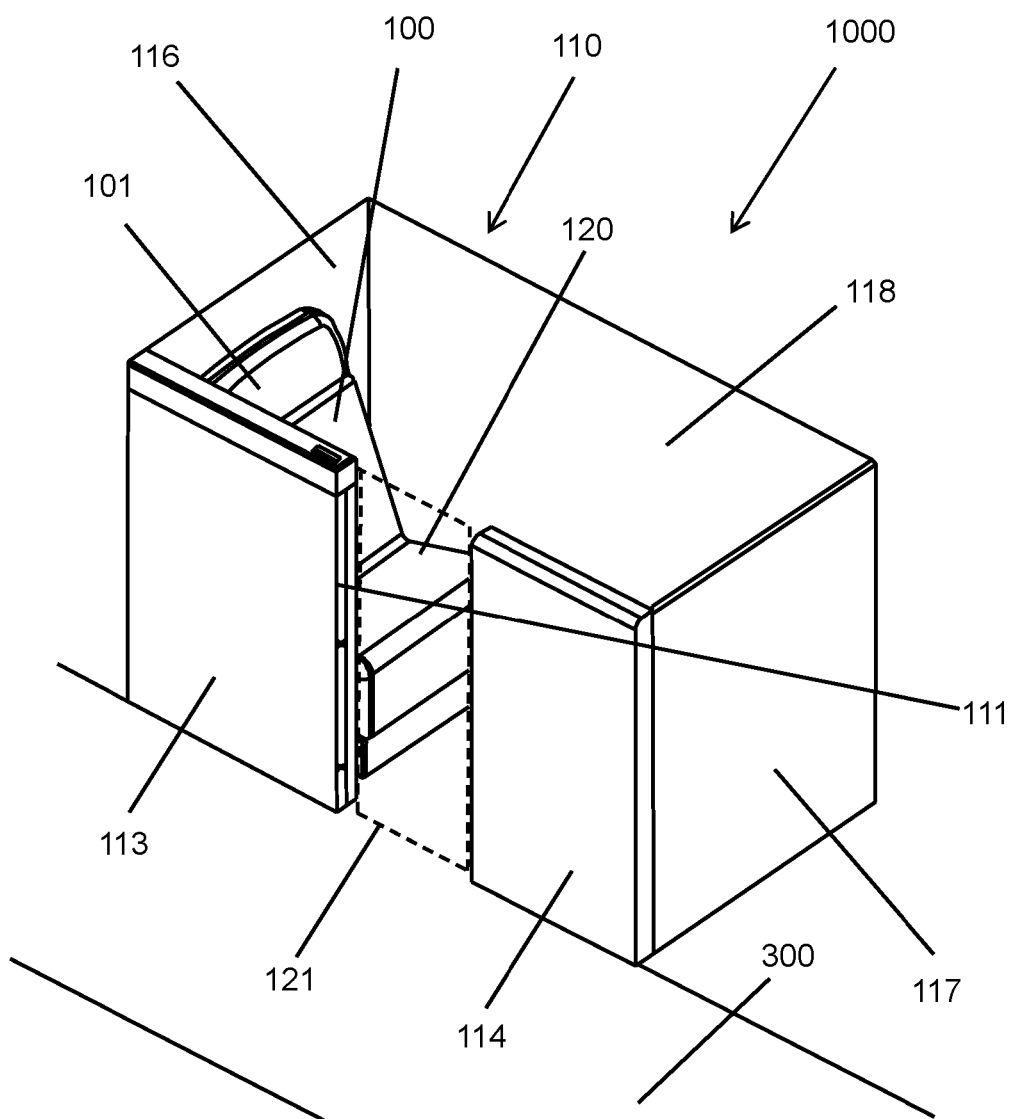
FIG. 1 is a perspective view of an aircraft passenger accommodation unit according to an embodiment of the invention, with a door shown in a fully open configuration, situated adjacent to an aisle of an aircraft.

FIG. 1 shows a perspective view of an aircraft passenger accommodation unit 1000 according to a first embodiment of the invention. The aircraft passenger accommodation unit 1000 is situated adjacent to an aisle 300 of an aircraft. The aircraft passenger accommodation unit 1000 comprises a shell 110 that partially surrounds a seat 100. The shell 110 is generally rectangular with two shorter end walls 116, 117 and two longer sides. A first wall 113 lies along the first long side, adjacent the aisle 300, and lies to the side of the seat 100. A second wall 114 also lies along the first long side, adjacent the aisle 300, and an opening 120 is defined between the first wall 113 and the second wall 114. The opening 120 allows access between the aisle 300 and the interior of the unit 1000 (i.e. inside the shell 110). A parallel shell wall 118 lies along the second long side of the shell. The two shorter end walls 116, 117 are perpendicular to the long sides of the shell 110. One of the shorter end walls 116 is positioned behind the seat 100 substantially parallel to the seat back 101. The second shorter end wall 117 is positioned in front of the seat 100.

The aircraft passenger accommodation unit 1000 comprises a door 130, which is not visible in FIG. 1, since in FIG. 1, the door 130 is in a fully open and retracted position. The door 130 comprises a base portion 131 and an upper portion 132. When the door 130 is in this fully open configuration, the door 130 is retracted into a first cavity 111 in the first wall 113. The base portion 131 is retracted into the cavity 111 and the upper portion 132 is stowed behind the base portion 131, also within the cavity 111. When the door 130 is in a fully open configuration, as show in FIG. 1, the opening 120 defined by the shell 110 is fully accessible and provides a first access area 121 (indicated by dashed lines). Hence, a passenger can freely move between the aisle 300 and the inside of the unit 1000.

Figure 2:
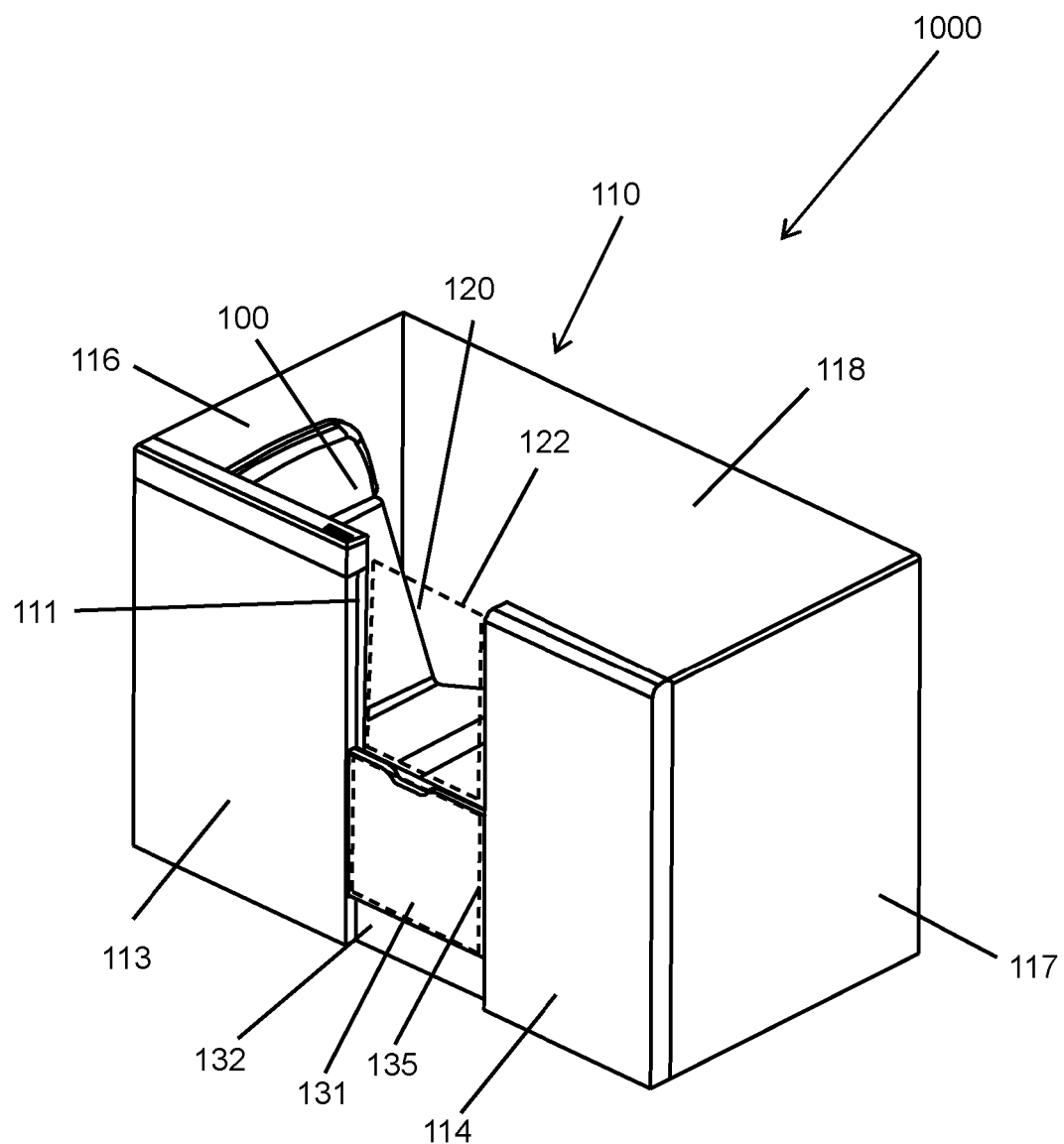
FIG. 2 is a perspective view of the aircraft passenger accommodation unit of FIG. 1, with the door in a first partially open configuration.

FIG. 2 shows the aircraft passenger accommodation unit with the door 130 in a first partially open configuration. The upper portion 132 is stowed behind the base portion 131. In this first partially open configuration, the base portion 131 and upper portion 132 of the door 130 are extended out from the cavity 111 and span the opening 120, and extend into a second cavity 112 (not visible in FIG. 2) on other side. When the door 130 is in this partially open configuration, a second access area 122 is provided (indicated by dashed lines), which has the same width as the first access area 121 and a reduced height, relative to the aircraft cabin floor compared to the first access area 121. A passenger can access the aisle 300 from the unit 1000 through this second access area 122 (for example, by stepping over the door 130).

Figure 3:
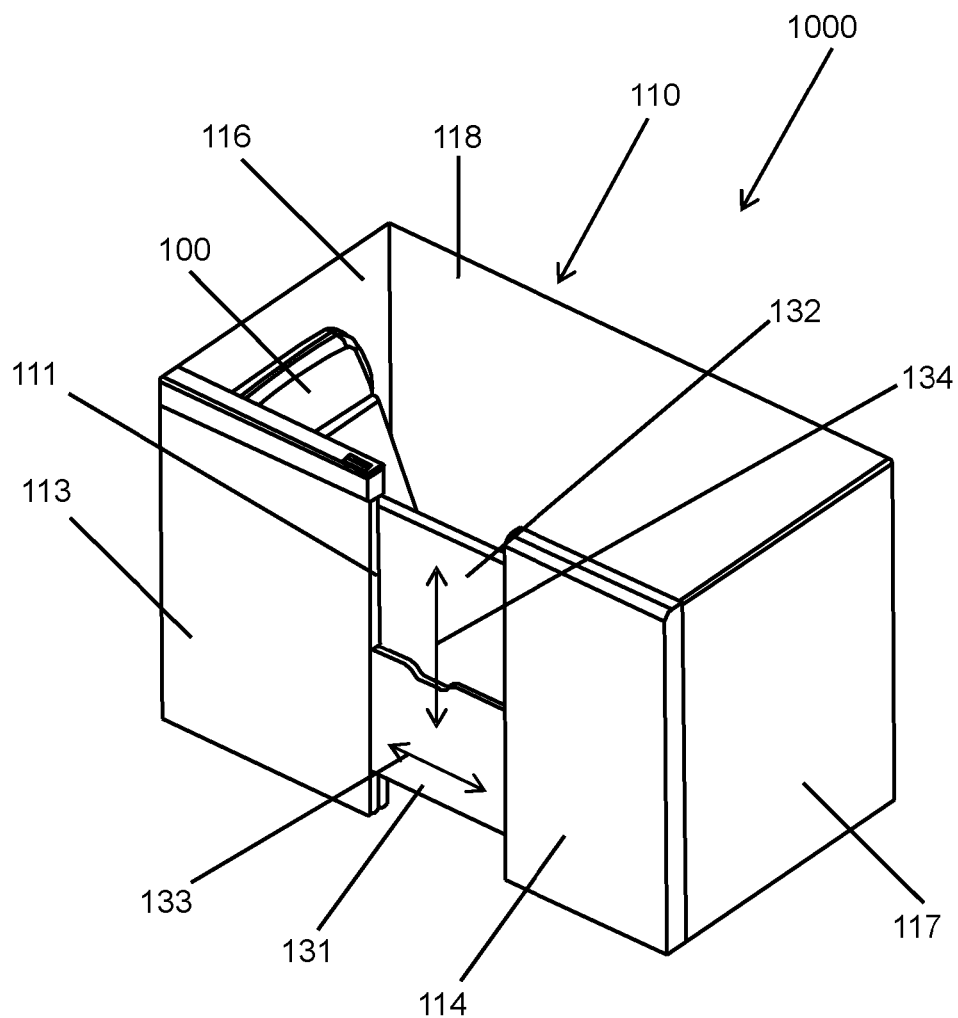
FIG. 3 is a perspective view of the aircraft passenger accommodation unit of FIGS. 1 and 2 showing the door in a closed configuration.

FIG. 3 shows the aircraft passenger accommodation unit 1000 of FIG. 1 with the door 130 in a fully closed configuration, with the base portion 131 extended, and the second portion 132 deployed. In the fully closed configuration, the base portion 131 is extended out from the cavity 111 to span the opening 120 (as it is in FIG. 2), and the upper portion 132 is deployed upwardly from the base portion 131, such that the upper portion 132 effectively increases the height of the door 130, relative to the aircraft cabin floor.

As can be seen in FIG. 3, the upper portion 132 and base portion 131 are offset relative to each other. Hence, in the partially open configuration of FIG. 2 the upper portion 132 is stowed behind the base portion 131 (i.e. on the inside of the base portion 131 in relation to the shell 110). The degree of overlap between the base portion 131 and the upper portion 132 defines an overlap area (indicated by dashed lines in FIG. 2) 135. In the configuration shown in FIG. 2, the first overlap area 135 is approximately equal to the area of the upper portion 131. When the upper portion 132 is in the deployed configuration (FIG. 3), the overlap between the upper portion 132 and the base portion 131 is reduced, and is defined by a second overlap area. In FIG. 3, the second overlap area is small (they overlap by a height of 55 mm).

Figure 4:
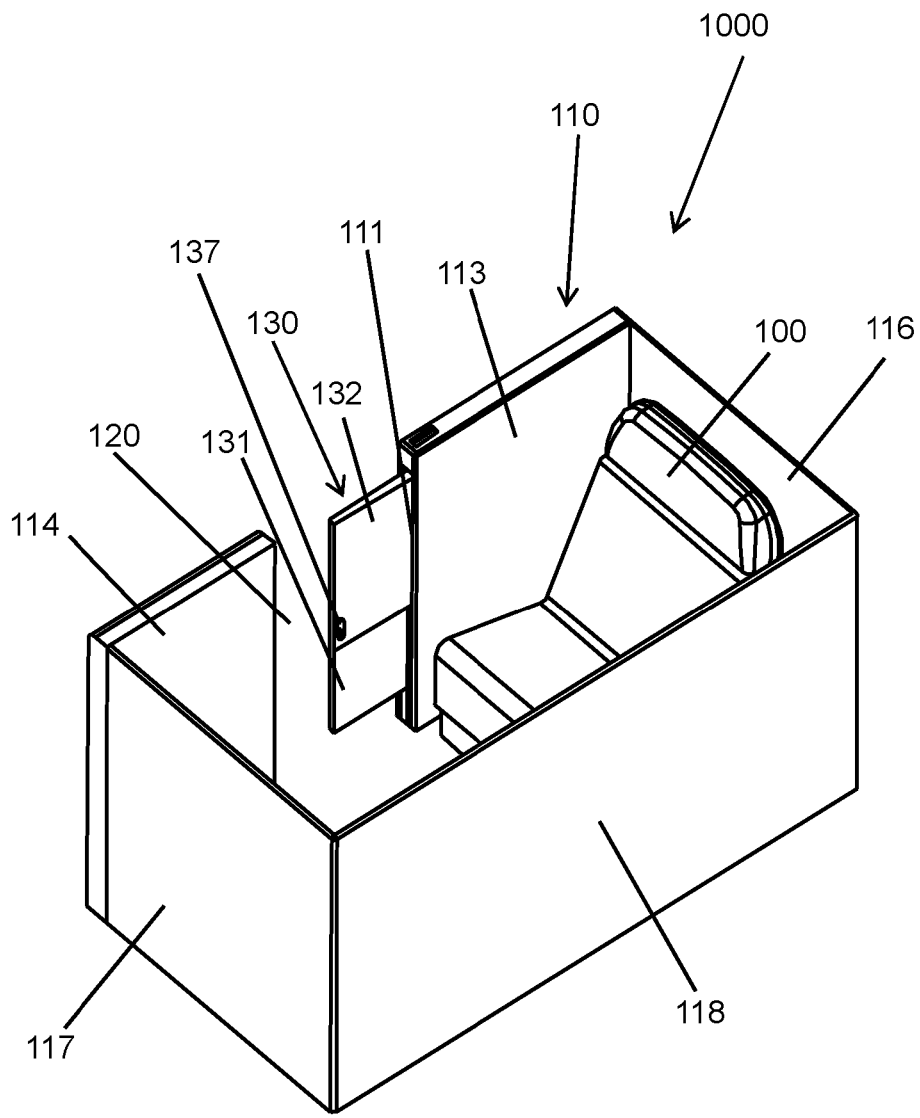
FIG. 4 is a different perspective view of the aircraft passenger accommodation unit of FIGS. 1-3 with the door in a second partially open configuration.

FIG. 4 shows the aircraft passenger accommodation unit of FIG. 1 with the door 130 in a second partially open configuration. In this configuration, the upper portion 132 is in the deployed configuration relative to the base portion 131, such that the door 130 is at its full height relative to the aircraft cabin floor. The base portion 131 and upper portion 132 are in a partially extended configuration, spanning a portion of the opening 120.

The base portion 131 and upper portion 132 are connected and move coincidentally between the extended and retracted states.

The first cavity 111 in the first wall 113 of the shell 110 is sufficiently tall for the door 130 to be retracted into the cavity 111 when the upper portion 132 is in the deployed configuration. The upper portion 132 of the door includes a finger hold 137 on an inner side of the second portion (i.e. facing towards the seat 110) that enables a passenger occupying the seat 100 (or otherwise in the unit) to easily slide the door 130 between extended and retracted configurations.

Figure 5:
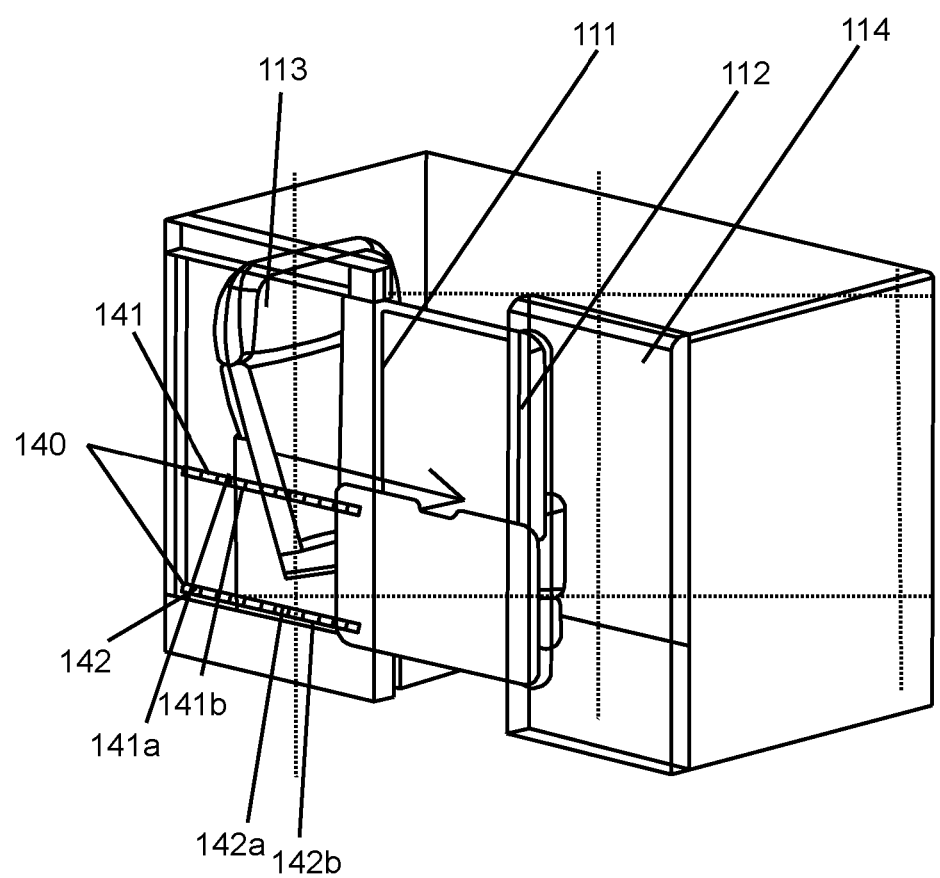
FIG. 5 is a perspective view of the aircraft passenger accommodation unit of FIGS. 1-4 with shell walls shown partially transparent.
Figure 6:
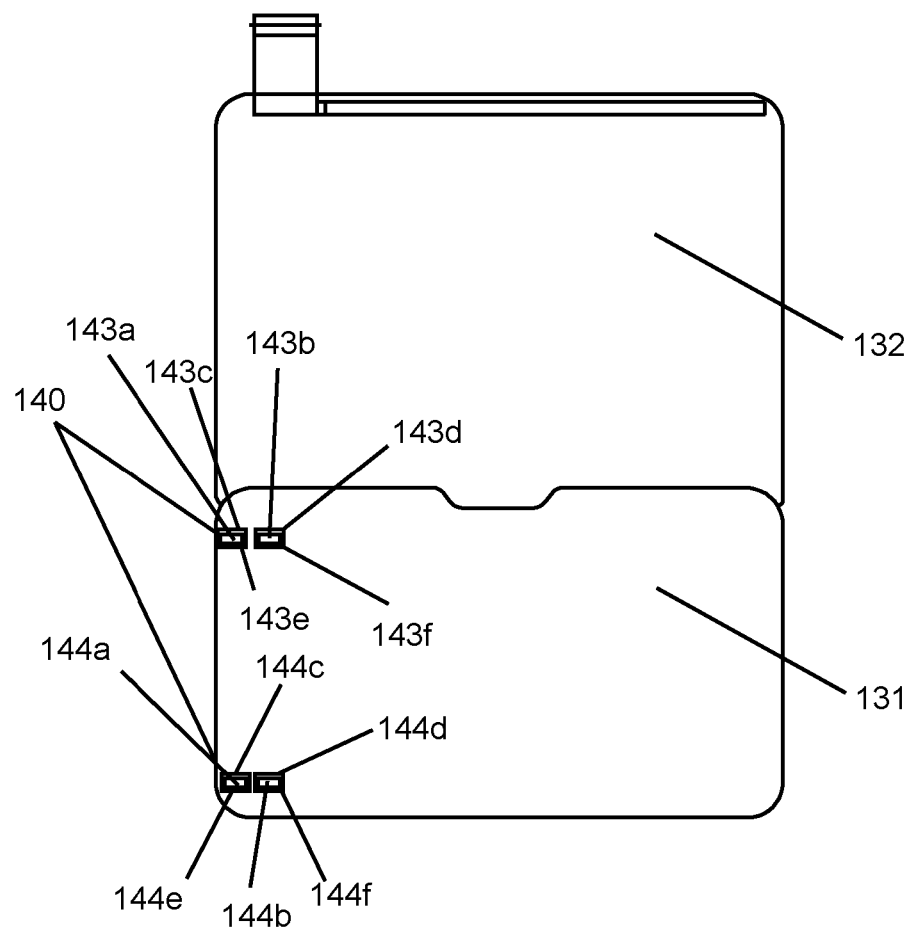
FIG. 6 is a front view of the door of the aircraft passenger accommodation unit of FIGS. 1-5.

FIGS. 5 and 6 show a guide mechanism 140 that enables the base portion 131 to translate between retracted and extended configurations. FIG. 5 is a schematic perspective view, and the first wall 113 is shown transparent such that the first cavity 111 provided in the first wall 113 can be seen. A first retraction guide track 141 and second retraction guide track 142 are provided on an inner surface of an outer wall of the first cavity 111. Each of the guide tracks 141, 142 has an upper abutment portion 141a, 142a, and a lower abutment portion 141b, 142b. FIG. 5 shows the door in fully closed configuration, in which the door extends into the second cavity 112 provided in the second wall 114.

As shown in FIG. 6, a first pair of retraction guide members 143a, 143b and second pair of retraction guide members 144a, 144b are provided on an outer surface of the base portion 131. The retraction guide members 143a, 143b, 144a, 144b are arranged such that the first pair of retraction guide members 143a, 143b engage a first retraction guide track 141, and the second pair of retraction guide members 144a, 144b engage a second retraction guide track 142. Therefore, the base portion 131 can be translated between the retracted configuration and the extended configuration. The outer surfaces of the retraction guide members 143a, 143b, 144a, 144b form upper 143c, 143d, 144c, 144d and lower abutment surfaces 143e, 143f, 144e, 144f that are positioned to engage corresponding abutment surfaces of the guide tracks 141a, 142a, 141b, 142b. The base portion 131 can be translated between the retracted configuration and the extended configuration, and during this translation the abutment portions of the guide tracks 141a, 142a, 141b, 142b enclose the abutment surfaces of the retraction guide members 143a, 143b, 144a, 144b, thereby preventing vertical translation of the base portion 131.

Figure 7:
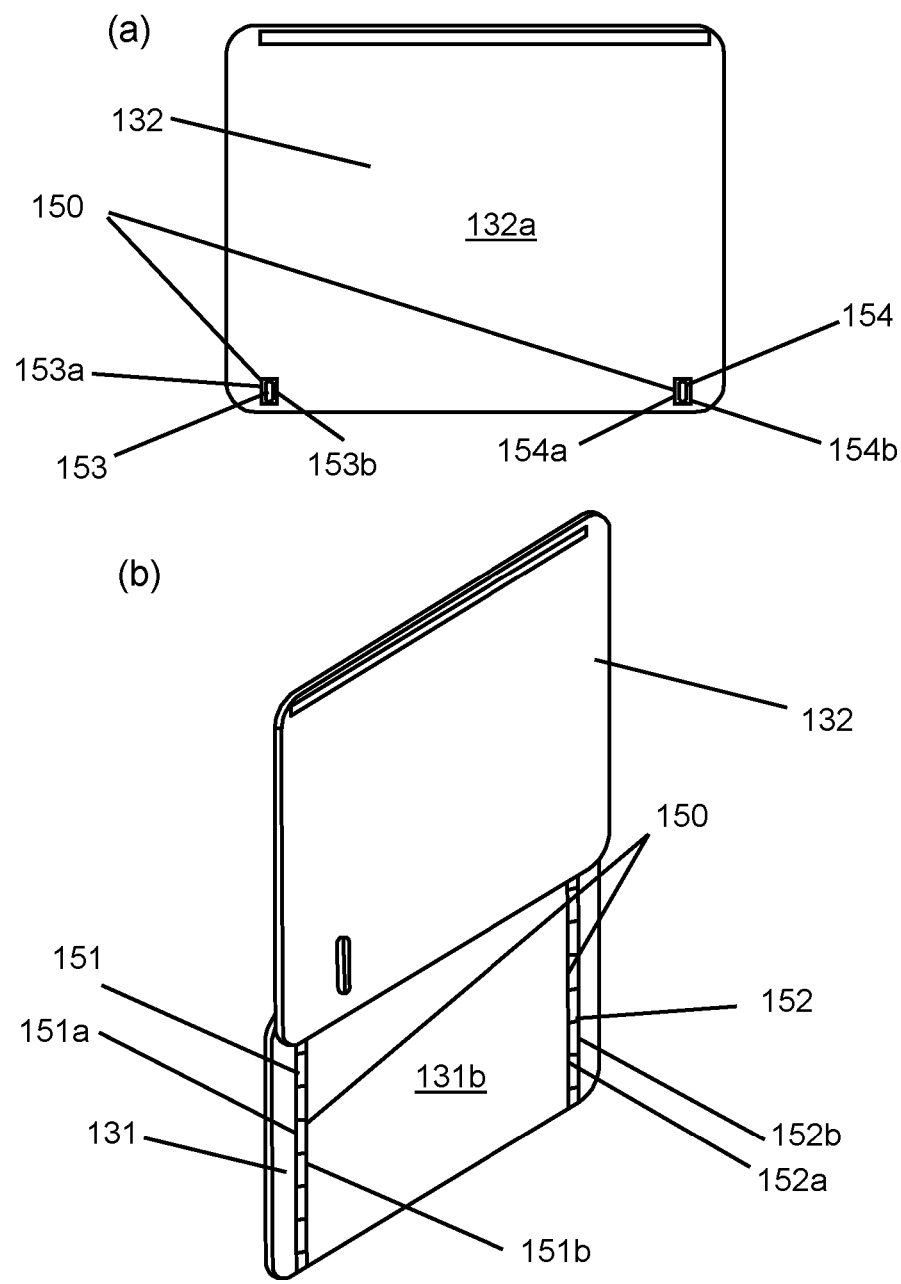
FIG. 7a is a front view of an upper portion of the door of FIG. 6.
FIG. 7b is a perspective view of the door of FIG. 6 in the fully closed configuration.

FIG. 7 shows a guide mechanism 150 mounted on the door 130. FIG. 7a is a front view of an outer surface 132a of the second portion of the door 132, as it would be viewed from the aisle. Deployment guide members 153, 154 are attached to an outer surface 132a of the upper portion 132. The deployment guide members 153, 154 are arranged to engage corresponding deployment guide tracks 151, 152 that are attached to an inner surface 131b of the base portion 131 of the door (not shown in FIG. 7a).

FIG. 7b shows a perspective view of the base portion 131 and the upper portion 132, and shows the first guide track 151 and a second guide track 152, which are attached to an inner surface 131b of the base portion of the door 131. The deployment guide tracks 151, 152 are arranged to engage the deployment guide members 153, 154 that are attached to an outer surface 132a of the second portion of the door 132. Therefore the upper portion of the door 132 can be translated relative to the base portion 131 between stowed and deployed positions. Each of the deployment guide track 151, 152 has a first abutment surface 151a, 152a and a second abutment surface, 151b 152b. The outer surfaces of the deployment guide members have corresponding abutment surfaces 153a, 153b, 154a, 154b that are positioned to engage the abutment portions of the rails. The upper portion 132 can be translated between the stowed configuration and the deployed configuration, and during this translation, the abutment surfaces of the guide tracks 151a, 151b, 152a, 152b, enclose the abutment surfaces 153a, 153b, 154a, 154b of the deployment guide members 153, 154 thereby preventing lateral translation of the upper portion 132.

Figure 8:
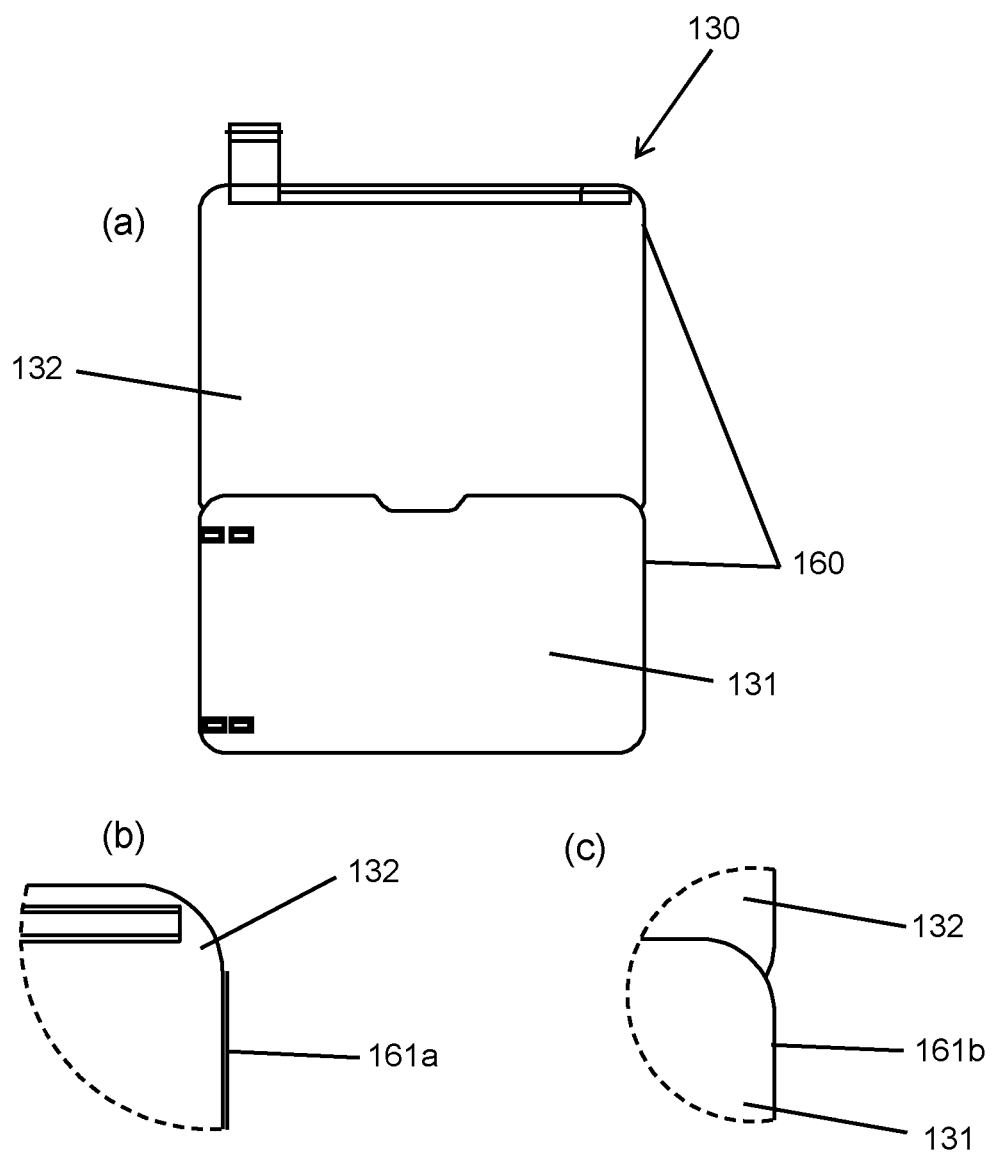
FIG. 8(a) is a front view of the door of the passenger aircraft accommodation unit of FIGS. 1-5 showing a securement mechanism.
FIG. 8(b) is an enlarged view of a first part of a securement mechanism of the door of FIGS. 6, 7a and 7b, provided on an upper portion of the door.
FIG. 8(c) is an enlarged view of a second part of a securement mechanism provided on a base portion of the door.
Figure 9:
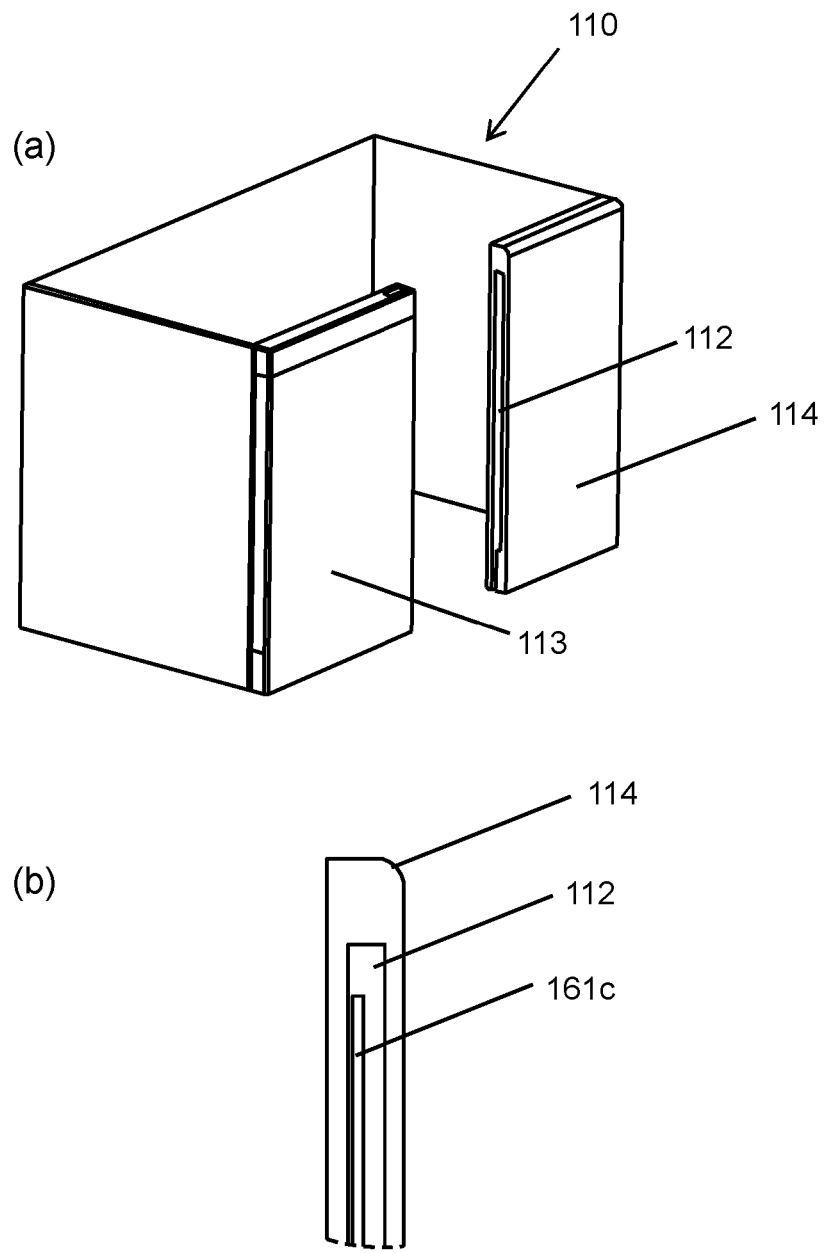
FIG. 9(a) is a further perspective view of the aircraft passenger accommodation unit of FIGS. 1-5.
FIG. 9(b) is an enlarged end of a second cavity of the aircraft passenger accommodation unit of FIGS. 1-5 and FIG. 9(a)

FIGS. 8 and 9 show a securement mechanism 160 mounted on the door 130 and within the second cavity 112. The securement mechanism 160 enables the door 130 to be secured in the closed configuration (i.e. the position shown in FIG. 3). The securement mechanism 160 is a magnetic latch 161 formed of three magnetic strips 161a, 161b, 161c. The first magnetic strip 161a is mounted on an upper right corner of the upper portion 132. The second magnetic strip 161b is mounted on an upper right corner of the base portion 131, and the third magnetic strip 161c is mounted within a second cavity 112 within the second wall portion 114 of the shell 110 (shown in FIGS. 9a and 9b). The third magnetic strip 161c is longer than the first and second magnetic strips 161a, 161b and extends the length between the first 161a and second 161b magnetic strips.

The magnetic strips 161a, b, c are arranged such that as the door 130 translates towards the extended configuration, the first and second magnetic strips 161a, 161b are magnetically attracted to the third magnetic strip 161c. When the base portion 131 is in the fully extended configuration the first magnetic strip 161a is in contact with the third magnetic strip 161c. When the upper portion 132 is in the deployed position, the first magnetic strip 161a and the second magnetic strip 161b are in contact with the third magnetic strip 161c. As a result of the magnetic attraction between the first/second magnetic strips 161a, 161b and the third magnetic strip 161c, the magnetic latch 161 will secure the door in the closed position when the base portion 131 is fully extended and when the upper portion 132 is either deployed or stowed. The magnetic latch 161 can be released by pulling the door (for example using the finger hold 137) towards the first wall portion 113, i.e. towards the retracted configuration.

Figure 10:
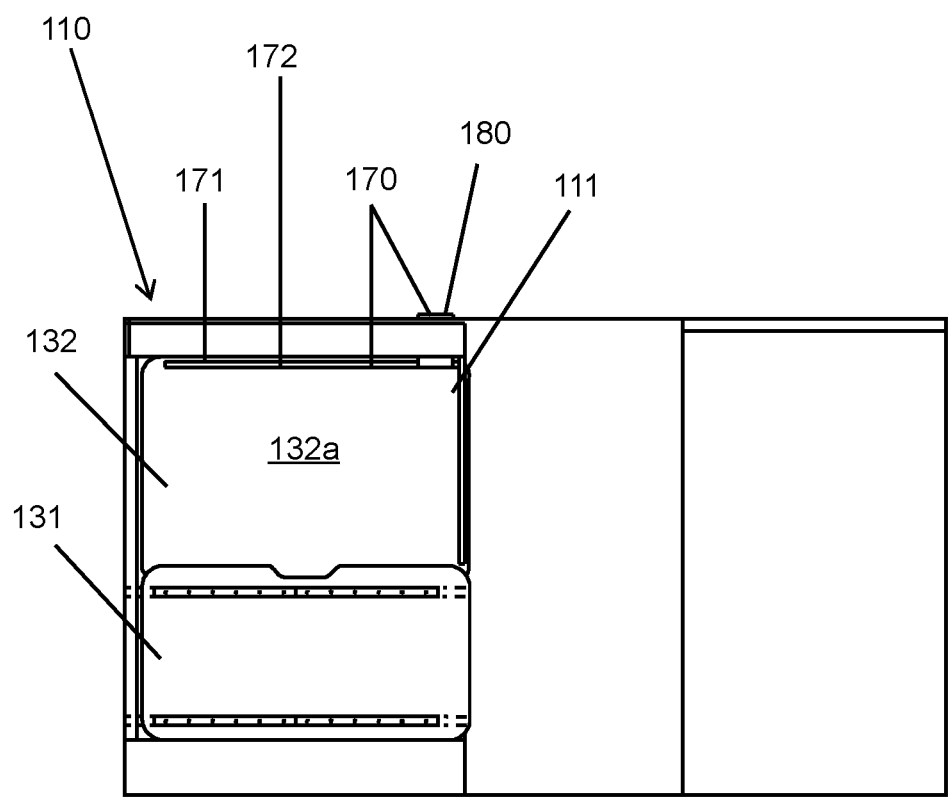
FIG. 10 is a side view of the aircraft passenger accommodation unit of FIGS. 1-5 and FIG. 9, viewed from an aisle.
Figure 11:
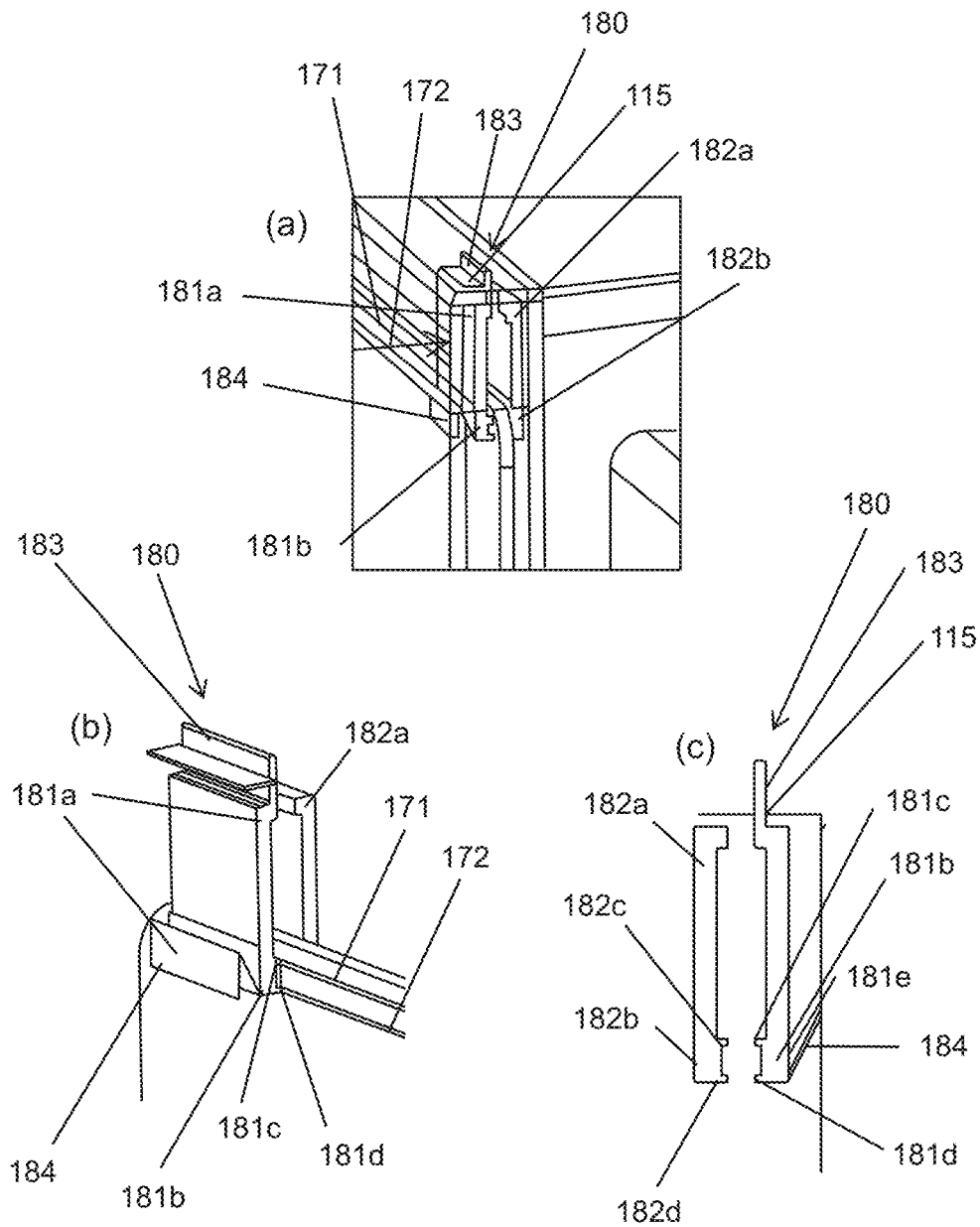
FIG. 11(a) is a perspective view of an upper region of the shell of the aircraft passenger accommodation unit of FIGS. 1-5 and FIG. 9-10 showing a guide mechanism and the door shown in a second fully open configuration.
FIG. 11(b) is a perspective view of the guide mechanism of FIG. 11(a) with the door in the closed configuration.
FIG. 11(c) is an end view of the guide mechanism of FIGS. 11(a) and 11(b)

FIGS. 10 and 11 show a guide mechanism 170 formed of an upper guide track 171 and a lower guide track 172. The upper guide track 171 and the lower guide track 172 extend along the top of an outer surface 132a of the upper portion 132. The guide mechanism 170 further comprises a guide runner member 180 that is attached to the shell 110 and housed in the first cavity 111. The guide runner member 180 is arranged to engage the upper guide track 171 and the lower guide track 172 when the upper portion 132 is in the deployed configuration, thereby supporting the upper portion 132 in the deployed position.

The guide runner member 180 has a pair of jaws 181, 182, (shown in FIG. 11) which face each other. Each jaw has an upper portion 181a, 182a and a lower portion 181b, 182b. At the lower portion of each jaw 181b, 182b there are two claw-like projections 181c, 182c, 181d, 182d one above the other, which are spatially separated and arrange to engage the upper guide track 171 and the lower guide track 172. When the guide runner member 180 engages the guide tracks 171, 172, the upper projections 181c, 182c abut the upper surface of the upper guide track 171, and the lower projections 181d, 182d abut the lower surface of the lower guide track 172. The guide runner member 180 has a release tab 183 provided at the upper end 181a of one of the jaws 181. The guide runner member 180 is arranged in the shell 110 such that the release latch 183 protrudes from a hole 115 (shown in FIGS. 11(a) and (c)) in an upper surface of the shell wall 113. A Z-shaped spring 184 is attached an outer surface 181e, of the lower end 181b of one of the jaws 181. The Z-spring 184 biases the jaw 181 towards a towards the other guide jaw 182. The guide runner member 180 can be moved into an open configuration by pushing the release tab 183. This moves the lower end of the jaw 181b towards the wall of the cavity 111 against the biasing force of the Z-spring 184, increasing the separation of the jaws 181, 182. If the release tab 183 is released the Z-spring 184 pushes the lower end of the jaw 181b towards the lower end of the opposing jaw 182, thereby moving the guide runner member 180 into a closed configuration.

Figure 12:
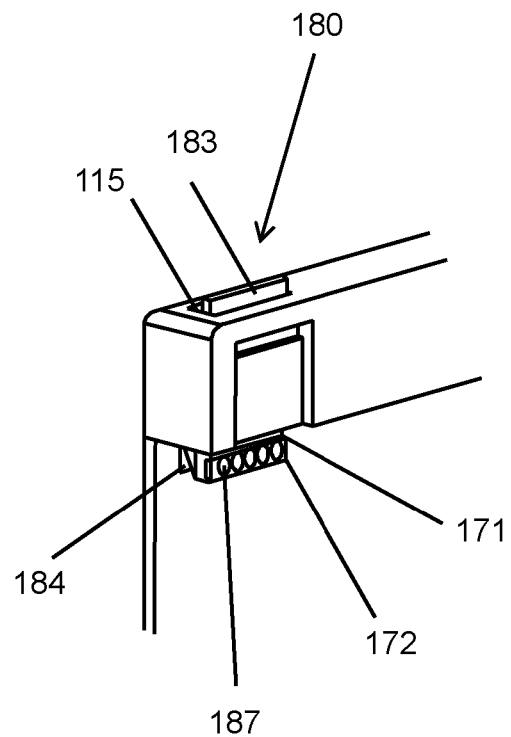
FIG. 12 is a rear perspective a guide mechanism of FIGS. 11(a), 11(b) and 11(c)

FIG. 12 shows a perspective view of a guide runner member 180 and a portion of the upper guide track 171 and lower guide track 172 according to an embodiment of the invention. A plurality of bearings 187 are provided between the upper guide track 171 and lower guide track 172. The bearings 187 facilitate translation of the guide runner member 180 relative to the upper and lower guide tracks 171, 172.

Figure 13:
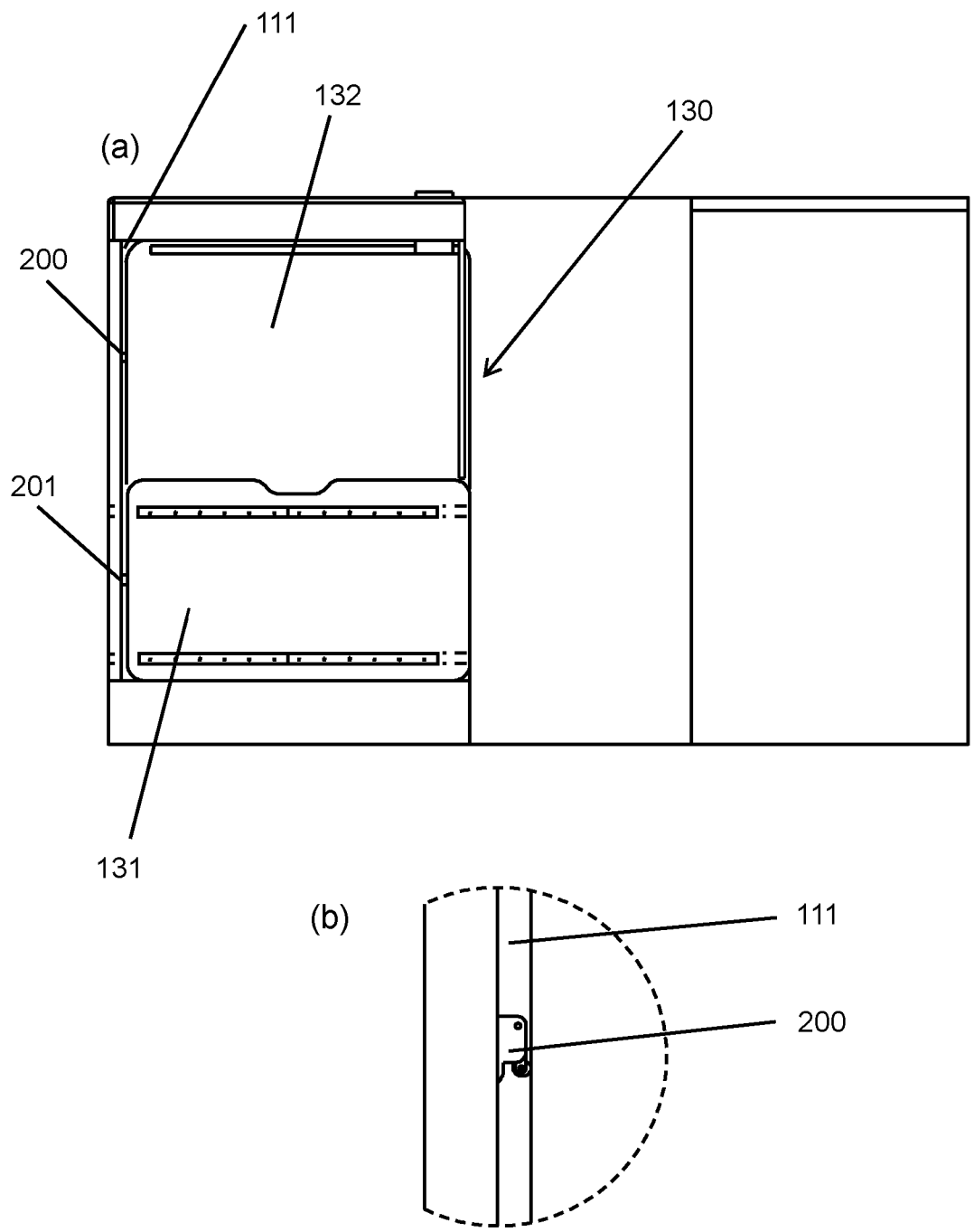
FIG. 13(a) is a side view of the aircraft passenger accommodation unit of FIGS. 1 to 5 and 9 to 11 viewed from the aisle.
FIG. 13(b) is a close-up view of a push-push latch shown in FIG. 13(a).

FIG. 13 shows push-push latches 200, 201 that are used to secure the door in the retracted position. A first push-push latch 200 is provided at a lower region inside the first cavity 111, at a back of the cavity. The first push-push latch 200 is positioned to engage with an edge of the base portion 131 when the door 130 is in the retracted configuration. The second push-push latch 201 is provided at an upper region inside at the back of the first cavity 111. The second push-push latch 201 is positioned to engage the upper portion of the door 132 when the door 130 is in the retracted configuration and when the upper portion 132 is in the deployed configuration. When the door is translated from the extended configuration to the retracted configuration, the door will engage one or both of the push-push latches 200, 201 (depending on whether the second portion of the door 130 is stowed or deployed) as it reaches the fully retracted configuration. One or both of the push-push latches 200, 201 will secure the door 130 in the retracted configuration.

In use, a user may wish to move the door 130 from the fully open and retracted configuration of FIG. 1, into either the extended but stowed configuration of FIG. 2, or the extended but deployed configuration of FIG. 3. If a user wishes to move the door 130 from the retracted configuration to an extended, or partially extended configuration, they can push on the edge of the door 130 that is exposed at the opening of the first cavity 111. This will release the push-push latch/latches 200, 201, and the door 130 can then translate from the retracted position along the second direction.

To move the door 130 from the configuration of FIG. 1 to the configuration of FIG. 2, the base portion 131 can be translated using the guide mechanism 140, and can be secured in the closed configuration using the securement mechanism 160. To move the door 130 from the configuration of FIG. 2 to the configuration of FIG. 3, a user can slide the upper portion of the door 132 upwards along a first direction 133 using the guide mechanism 150. A user can secure the upper portion of the door 132 in a deployed configuration using the guide runner member 180. As the upper portion 131 is moved upwards, the pressure of the upper portion on the jaws 181,182 of the guide runner mechanism 180 may cause the jaws 181,182 to move into an open configuration. The upper portion 132 can then be moved between the jaws 181,182.

If the door 130 is in the extended by deployed configuration of FIG. 3, a user can move the door 130 back into the configuration of FIG. 1, either by sliding the door back into the first cavity 111, whilst the upper portion 132 is in the deployed position, or by first moving the upper portion 132 back into the stowed position If a user wishes to moving the upper portion 132 of the door from the deployed configuration to the stowed configuration, for example, due to malfunction of the track 141 and 142, guide members 143 and 144 in an emergency, they can do so by simply pressing on the release tab 183. This causes the jaws 181,182 to move from a closed state to an open state. The upper portion of the door 132 drops along the tracks 151,152 under gravity towards the stowed position.

If a user wishes to translate the base portion 131 between extended and retraction configurations along a second direction 134, whilst the upper portion 132 is in the deployed state, the guide runner member 180 may guide the upper guide track 171 and lower guide track 172, thereby maintaining the height of the upper portion of the door 132 and maintaining a constant degree of overlap with the base portion of the door 131. The base portion 131 and upper portion 132 are connected and translate coincidentally between the extended and retracted configurations Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the embodiments described above, the shell is generally rectangular, however in other embodiments the shell may be square, oval or any other suitable shape.

Similarly, in the embodiments described above, the door is generally rectangular. In other embodiments the door can be any suitable shape that can span an opening defined by the shell.

In the embodiments described above, guide mechanisms have been described that comprise guide tracks, or guide rails, and corresponding guide members. In other embodiments, any suitable guide mechanisms may be used, for example, comprising wheels and runners.

In the embodiments described above, when the door is in the retracted configuration, the door is provided in a cavity in the first wall. However, in other embodiments, a cavity may not be provided in the first wall, and in the retracted configuration, the door may lie against an inner surface of the first wall (i.e. against an inner surface of the shell), or against an outer surface of the first wall (i.e. against an outer surface of the shell).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft passenger accommodation unit for location in an aircraft cabin adjacent to an aisle, comprising:
   (i) a seat;
   (ii) a shell at least partially surrounding the seat, wherein the shell defines an opening that allows a passenger to egress between the aisle and the seat; and
   (iii) a door for providing variable access through the opening between the aisle and the seat, wherein the door comprises:
      a base portion, translatable in a first direction across the opening of the shell, between a retracted position, which allows passenger egress between the seat and the aisle through the opening, and an extended position in which passenger egress between the aisle and the seat through the opening is at least partially blocked by the base portion; and
      a second portion, translatable relative to the base portion in a second direction that is transverse to the first direction, the second portion being translatable between a stowed position in which the second portion at least partially overlaps the base portion to define a first overlap area of the base portion and a deployed position in which a second overlap area of the base portion is defined, the second overlap area being smaller than the first overlap area;
      wherein, when the second portion is in the deployed position, the base portion is able to translate between the extended position and the retracted position,
      the aircraft passenger accommodation unit further comprising a support mechanism, wherein the support mechanism is arranged to support the second portion when the second portion is in the deployed position, wherein the support mechanism comprises a guide mechanism arranged to guide translation of the second portion when the second portion is in the deployed position and the base portion is translated between the extended and retracted positions, and wherein the guide mechanism comprises a guide track and a corresponding guide member, wherein the second portion is provided with one of the guide track and the guide member, and the shell is provided with the other of the guide track and the guide member, and wherein the guide member and guide track are arranged so that the guide member is engageable with and translatable relative to the guide track, so as to guide translation of the second portion when the second portion is in the deployed position and the base portion is translated between the extended and retracted positions; and wherein the guide member comprises at least two guide jaws, and a biasing member that biases the jaws towards each other to retain the guide track in between the jaws when the second portion is in the deployed position.

2. The aircraft passenger accommodation unit of claim 1, wherein the guide track is provided on and extends across the second portion of the door in a direction substantially parallel to the first direction, and wherein the guide member is provided on the shell.

3. The aircraft passenger accommodation unit of claim 1, wherein the guide member comprises a release latch, and wherein, when the release latch is activated, the release latch acts against the biasing member, and causes the guide jaws to move apart from each other and enables the guide track to be released.

4. The aircraft passenger accommodation unit of claim 3, wherein the shell is provided with the guide member, and wherein at least a portion of the release latch protrudes from the shell.

5. The aircraft passenger accommodation unit of claim 3, wherein, when the second portion is in the deployed position, activation of the release latch allows the second portion to move to the stowed position.

6. The aircraft passenger accommodation unit of claim 5, wherein the guide member comprises a first guide member abutment surface and the guide track comprises a corresponding first guide track abutment surface, wherein the first guide member abutment surface and first guide track abutment surface are arranged such that the first guide member abutment surface abuts the first guide track abutment surface when the second portion is in the deployed position, thereby preventing one of:

a. movement of the second portion from the deployed position towards the stowed position, and b. movement of the second portion from the deployed position further away from the stowed position.

7. The aircraft passenger accommodation unit of claim 6, wherein the guide member comprises a second guide member abutment surface, facing in an opposite direction to the first guide member abutment surface, and the guide track comprises a second guide track abutment surface, facing in an opposite direction to the second guide track abutment surface, wherein the second guide member abutment surface and second guide track abutment surface are arranged such that the second guide member abutment surface abuts the second guide track abutment surface when the second portion is in the deployed position, thereby preventing the other of:

a. movement of the second portion from the deployed position towards the stowed position, and b. movement from the deployed position further away from the stowed position.

8. The aircraft passenger accommodation unit of claim 1, further comprising a deployment guide mechanism, wherein the deployment guide mechanism is arranged to guide translation of the second portion between the stowed position and the deployed position.

9. The aircraft passenger accommodation unit of claim 8, wherein the deployment guide mechanism comprises a deployment guide track and a deployment guide member, wherein the base portion is provided with one of the deployment guide track and the deployment guide member, and the second portion is provided with the other of the deployment guide track and the deployment guide member, so as to guide translation of the second portion between the stowed position and the deployed position.

10. The aircraft passenger accommodation unit of claim 1, further comprising a retraction guide mechanism, wherein the retraction guide mechanism is arranged to guide translation of the base portion between the retracted position and the extended position.

11. The aircraft passenger accommodation unit of claim 10, wherein the retraction guide mechanism comprises a retraction guide track and a retraction guide member, wherein the base portion is provided with at least one of the retraction guide track and the retraction guide member, and wherein the shell is provided with the other of the retraction guide track and the retraction guide member, so as to guide translation of the base portion between the extended position and the retracted position.

12. The aircraft passenger accommodation unit of claim 1, further comprising a securement mechanism, wherein the securement mechanism is arranged to secure the base portion in the extended position.

13. The aircraft passenger accommodation unit of claim 12, wherein the securement mechanism comprises a magnetic latch, wherein the shell is provided with a first part of the latch, and the base portion is provided with a second part of the latch, the first and second parts being magnetically attracted to each other.

14. The aircraft passenger accommodation unit of claim 1, wherein the shell comprises a cavity for housing the door when the base portion is in the retracted position.

15. The aircraft passenger accommodation unit of claim 14, wherein the cavity provides space for the base portion and the second portion when the base portion is in the retracted position, and when the second portion is in the deployed position.

16. A method of opening or closing a door of an aircraft passenger accommodation unit, the method comprising steps of:

translating a base portion of the door in a first direction between a retracted position, which allows passenger egress through an opening defined by a shell of the aircraft passenger accommodation unit, and an extended position in which passenger egress through the opening is at least partially blocked; and translating a second portion of the door relative to the base portion in a second direction that is transverse to the first direction, between a stowed position, in which the second portion at least partially overlaps the base portion to define a first overlap area of the base portion, and a deployed position, in which a second overlap area of the base portion is defined, the second overlap area being smaller than the first overlap area, wherein the passenger accommodation unit further comprises a support mechanism, wherein the support mechanism is arranged to support the second portion when the second portion is in the deployed position, wherein the support mechanism comprises a guide mechanism arranged to guide translation of the second portion when the second portion is in the deployed position and the base portion is translated between the extended and retracted positions, and wherein the guide mechanism comprises a guide track and a corresponding guide member, wherein the second portion is provided with one of the guide track and the guide member, and the shell is provided with the other of the guide track and the guide member, and wherein the guide member and guide track are arranged so that the guide member is engageable with and translatable relative to the guide track, so as to guide translation of the second portion when the second portion is in the deployed position and the base portion is translated between the extended and retracted positions; and wherein the guide member comprises at least two guide jaws, and a biasing member that biases the jaws towards each other to retain the guide track in between the jaws when the second portion is in the deployed position.

17. A method of closing a door of an aircraft passenger accommodation unit, the aircraft passenger accommodation unit comprising:

(i) a seat, (ii) a shell at least partially surrounding the seat, wherein the shell defines an opening that allows a passenger to egress between an aisle and the seat, (iii) a door for providing variable access through the opening between the aisle and the seat, wherein the door comprises:

a base portion, translatable in a first direction across the opening of the shell, between a retracted position, which allows passenger egress between the seat and the aisle through the opening, and an extended position in which passenger egress between the aisle and the seat through the opening is at least partially blocked by the base portion; and a second portion, translatable relative to the base portion in a second direction that is transverse to the first direction, the second portion being translatable between a stowed position in which the second portion at least partially overlaps the base portion to define a first overlap area of the base portion and a deployed position in which a second overlap area of the base portion is defined, the second overlap area being smaller than the first overlap area; and (iv) a support mechanism, wherein the support mechanism is arranged to support the second portion when the second portion is in the deployed position, wherein the support mechanism comprises a guide mechanism arranged to guide translation of the second portion when the second portion is in the deployed position and the base portion is translated between the extended and retracted positions, and wherein the guide mechanism comprises a guide track and a corresponding guide member, wherein the second portion is provided with one of the guide track and the guide member, and the shell is provided with the other of the guide track and the guide member, and wherein the guide member and guide track are arranged so that the guide member is engageable with and translatable relative to the guide track, so as to guide translation of the second portion when the second portion is in the deployed position and the base portion is translated between the extended and retracted positions; and wherein the guide member comprises at least two guide jaws, and a biasing member that biases the jaws towards each other to retain the guide track in between the jaws when the second portion is in the deployed position, wherein the method comprises:

translating the base portion of the door in a first direction across the opening of the shell, from a retracted position, which allows passenger egress between the seat and the aisle through the opening, to an extended position in which passenger egress between the aisle and the seat through the opening is at least partially blocked; and subsequently translating the second portion of the door relative to the base portion in a second direction that is transverse to the first direction, from a stowed position, in which the second portion at least partially overlaps the base portion to define a first overlap area of the base portion, to a deployed position, in which a second overlap area of the base portion is defined, the second overlap area being smaller than the first overlap area.

18. The aircraft passenger accommodation unit of claim 4, wherein, when the second portion is in a deployed position, activation of the release latch allows the second portion to move to the stowed position.

* * * * *